S. Fawcett,
Shaft Coupling,
No. 53,219. Patented Mar. 13, 1866.
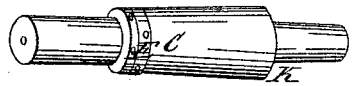
Fig. 1
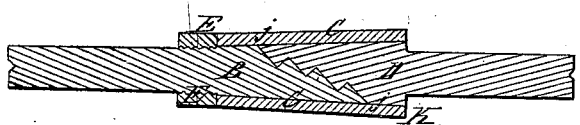
Fig. 2
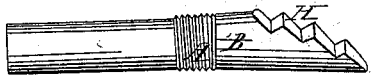
Fig. 3
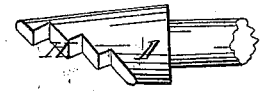
Fig. 4    Fig. 5
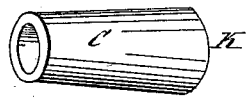
Witnesses
John H. Dale
Charles Seiler
Inventor
Samuel Fawcett

UNITED STATES PATENT OFFICE.

SAML. FAWCETT, OF ROCHESTER, NEW YORK, ASSIGNOR TO HIMSELF AND ALANSON BROWN, OF SAME PLACE.

COUPLING-SHAFT OF BORING-TOOLS.

Specification forming part of Letters Patent No. 53,219, dated March 13, 1866; antedated March 2, 1866.

*To all whom it may concern:*

Be it known that I, S. FAWCETT, of Rochester, county of Monroe, in the State of New York, have invented a new and Improved Coupling with a Corrugated Joint; and I do hereby declare that the following is a full, clear, and exact description thereof, reference being had to the accompanying drawings, and to the letters of reference marked thereon.

Figure 1 is a perspective view of a coupling with a corrugated joint on an enlarged scale. Fig. 2 is a longitudinal section of coupling. Fig. 3 is a view of corrugating-joint. Fig. 4 is a view of taper sleeve. Fig. 5 is a view of a jam-nut.

The nature of my invention consists in arranging a coupling with a corrugated joint in such a manner as to secure strength and durability, and not being liable to become disconnected. It consists in joining two pieces together by means of an irregular joint with a taper sleeve or band slipped over the joint, with two jam-nuts to prevent the sleeve or band from becoming misplaced.

To enable others skilled in the art to make and use my invention, I will proceed to describe its construction and operation.

Two pieces, D and B, are fitted together by a corrugated or irregular joint, H, extending diagonally from the point I to the point J, dividing it into two equal parts. A sleeve or band, C, made the desired taper, is fitted exactly over the joint, which is tapered from B to D, fitting sleeve or band C.

A thread, A, is cut on the shaft at the taper, by which two jam-nuts, E, force the sleeve or band on the taper B and D, holding it securely, thus making a joint that is secure and not liable to break where it is put together. The sleeve or band C and nuts E being on it is easily disconnected by loosening the jamb-nuts E, which hold sleeve C, then by driving the sleeve C at K just enough to loosen it, then slip it off, and the joint is disconnected.

What I claim as new, and desire to secure by Letters Patent, is—

The manner of coupling or joining two pieces together by means of a corrugated or irregular joint, a taper sleeve or band fitting over the same, in combination with jam-nuts to hold it firm, substantially in the manner and for the purpose described.

SAMUEL FAWCETT. [L. S.]

Witnesses:
   A. BROWN,
   JAS. MCEWEN.